(12) United States Patent
Haile

(10) Patent No.: US 11,914,496 B2
(45) Date of Patent: Feb. 27, 2024

(54) CONSISTENCY MONITORING OF DATA IN A DATA PIPELINE

(71) Applicant: Data Culpa, Inc., Carlisle, MA (US)

(72) Inventor: J. Mitchell Haile, Carlisle, MA (US)

(73) Assignee: Data Culpa, Inc., Carlisle, MA (US)

( * ) Notice: Subject to any disclaimer, the term of this patent is extended or adjusted under 35 U.S.C. 154(b) by 0 days.

(21) Appl. No.: 17/874,991

(22) Filed: Jul. 27, 2022

(65) Prior Publication Data

US 2023/0044986 A1 Feb. 9, 2023

Related U.S. Application Data

(60) Provisional application No. 63/228,734, filed on Aug. 3, 2021.

(51) Int. Cl.
*G06F 15/173* (2006.01)
*G06F 11/34* (2006.01)
*G06F 9/54* (2006.01)
*G06F 11/07* (2006.01)

(52) U.S. Cl.
CPC .......... *G06F 11/3409* (2013.01); *G06F 9/542* (2013.01); *G06F 11/0772* (2013.01)

(58) Field of Classification Search
None
See application file for complete search history.

(56) References Cited

U.S. PATENT DOCUMENTS

| 10,459,827 | B1* | 10/2019 | Aghdaie | G06F 11/0751 |
| 2021/0390455 | A1* | 12/2021 | Schierz | G06N 5/04 |
| 2022/0019598 | A1* | 1/2022 | Singh | G06F 16/2462 |
| 2022/0050813 | A1* | 2/2022 | Fridman | G06F 16/214 |
| 2022/0230024 | A1* | 7/2022 | Kallianpur | G06F 18/285 |
| 2022/0405659 | A1* | 12/2022 | Muthuswamy | G06Q 10/0635 |

* cited by examiner

*Primary Examiner* — Phyllis A Book

(57) ABSTRACT

Various embodiments comprise systems and methods to maintain data consistency in a data pipeline. In some examples, a computing system comprises data monitoring circuitry that monitors the operations of the data pipeline. The data pipeline receives input data, processes the input data, and generates output data. The data monitoring circuitry receives and processes the output data sets to identify changes between the output data sets. The data monitoring circuitry generates a consistency score based on the changes that indicates a similarity level between the output data sets. The data monitoring circuitry determines when the consistency score exceeds a threshold value. When the consistency score exceeds the threshold value, the data monitoring circuitry generates and transfers an alert that indicates ones of the output data sets that exceeded the threshold value.

20 Claims, 7 Drawing Sheets

CONSISTENCY MONITORING OF DATA IN A DATA PIPELINE

RELATED APPLICATIONS

This U.S. Patent Application claims priority to U.S. Provisional Patent Application 63/228,734 entitled "CONSISTENCY MONITORING OF DATA IN A DATA PIPELINE" which was filed on Aug. 3, 2021, and which is incorporated by reference into this U.S. Patent Application in its entirety.

BACKGROUND

A data pipeline comprises a series of data processing elements that intake data from a data source, process the input data for a desired effect, and transfer the processed data to a data target. Data pipelines are configured to intake data that comprises a known format for their data processing elements to operate accurately. When the input data to a data pipeline is altered, the data processing elements may not recognize the changes which can cause malfunctions in the operation of the data pipeline. Changes to input data often arise when the data sets are large which results in variety of technical issues exist when processing or ingesting data received through a data pipeline. Implicit schema and schema creep like typos or changes to schema often cause issues when ingesting data. Completeness issues can also arise when ingesting data. For example, completeness can be compromised when there is an incorrect count of data rows/documents, there are missing fields or missing values, and/or there are duplicate and near-duplicate data entries. Additionally, accuracy issues may arise when there are incorrect types in fields. For example, a string field that often comprises numbers is altered to now comprise words. Accuracy issues may further arise when there are incorrect category field values and incorrect continuous field values. For example, a continuous field may usually have distribution between 0 and 100, but the distribution is significantly different on updated rows or out of our usual bounds. Data pipelines may have bugs which impact data quality and data pipeline code is difficult to debug.

Data pipeline monitoring systems are employed to counteract the range of technical issues that occur with data pipelines. Traditional data pipeline monitoring systems employ a user defined ruleset that governs what inputs and outputs for a data pipeline should be structured. Manually defining a data ruleset is difficult and may require an extended period of time to create. The amount of high-quality data sets which are needed to manually generate data rulesets are often limited which further compounds this problem. The inputs and outputs of data pipelines may change over time, and as such, the manually defined rulesets can become outdated and must be updated. Although the manually defined rulesets are updated in response to the changes, the manually defined rulesets are often ineffective at differentiating between gradual changes and inconsistencies in the outputs of data pipelines. Unfortunately, the data pipeline monitoring systems do not effectively and efficiently maintain data consistency in the operations of the data pipelines.

OVERVIEW

This Overview is provided to introduce a selection of concepts in a simplified form that are further described below in the Detail Description. This summary is not intended to identify key features or essential features of the claimed subject matter, nor is it intended to be used as an aid in determining the scope of the claimed subject matter.

Various embodiments of the present technology generally relate to solutions for maintaining data integrity. Some embodiments comprise a data pipeline monitoring system configured to maintain data consistency in a data pipeline. A data pipeline receives data inputs, processes the data inputs, and responsively generates and transfers data outputs. In the data pipeline monitoring system, data monitoring circuitry monitors the operations of the data pipeline. The data monitoring circuitry receives the output data sets and processes the output data sets to identify changes between the output data sets. The data monitoring circuitry generates a consistency score for the output data sets based on the changes that indicates a similarity level between the output data sets. The data monitoring circuitry determines when the consistency score exceeds a threshold value. When the consistency score exceeds the threshold value, the data monitoring circuitry generates and transfers an alert that indicates ones of the output data sets that exceeded the threshold value.

Some embodiments comprise a method of operating a data pipeline monitoring system to maintain data integrity in a data pipeline. The method includes a data pipeline receiving data inputs, processing the data inputs, responsively generating data outputs, and transferring the data outputs. The method continues with data monitoring circuitry monitoring the operations of the data pipeline. The method continues with the data monitoring circuitry receiving the output data sets, processing the output data sets to identify changes between the output data sets, and generating a consistency score for the output data sets based on the changes that indicates a similarity level between the output data sets. The method continues with the data monitoring circuitry determining when the consistency score exceeds a threshold value. The method continues with the data monitoring circuitry generating and transferring an alert that indicates ones of the output data sets that exceeded the threshold value when the consistency score exceeds the threshold value.

Some embodiments comprise a non-transitory computer-readable medium storing instructions to maintain data consistency in a data pipeline. The instructions, in response to execution by one or more processors, cause the one or more processors to drive a system to perform pipeline monitoring operations. The operations comprise monitoring the operations of the data pipeline wherein the data pipeline receives input data sets, processes the input data sets, and responsively generates and transfers output data sets. The operations further comprise receiving the output data sets. The operations further comprise processing the output data sets to identify changes between the output data sets. The operations further comprise generating a consistency score for the output data sets based on the changes that indicates a similarity level between the output data sets. The operations further comprise determining when the consistency score exceeds a threshold value. The operations further comprise generating an alert that indicates ones of the output data sets that exceeded the threshold value when the consistency score exceeds the threshold value. The operations further comprise transferring the alert.

DESCRIPTION OF THE DRAWINGS

Many aspects of the disclosure can be better understood with reference to the following drawings. The components in the drawings are not necessarily drawn to sale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

Figure 1:
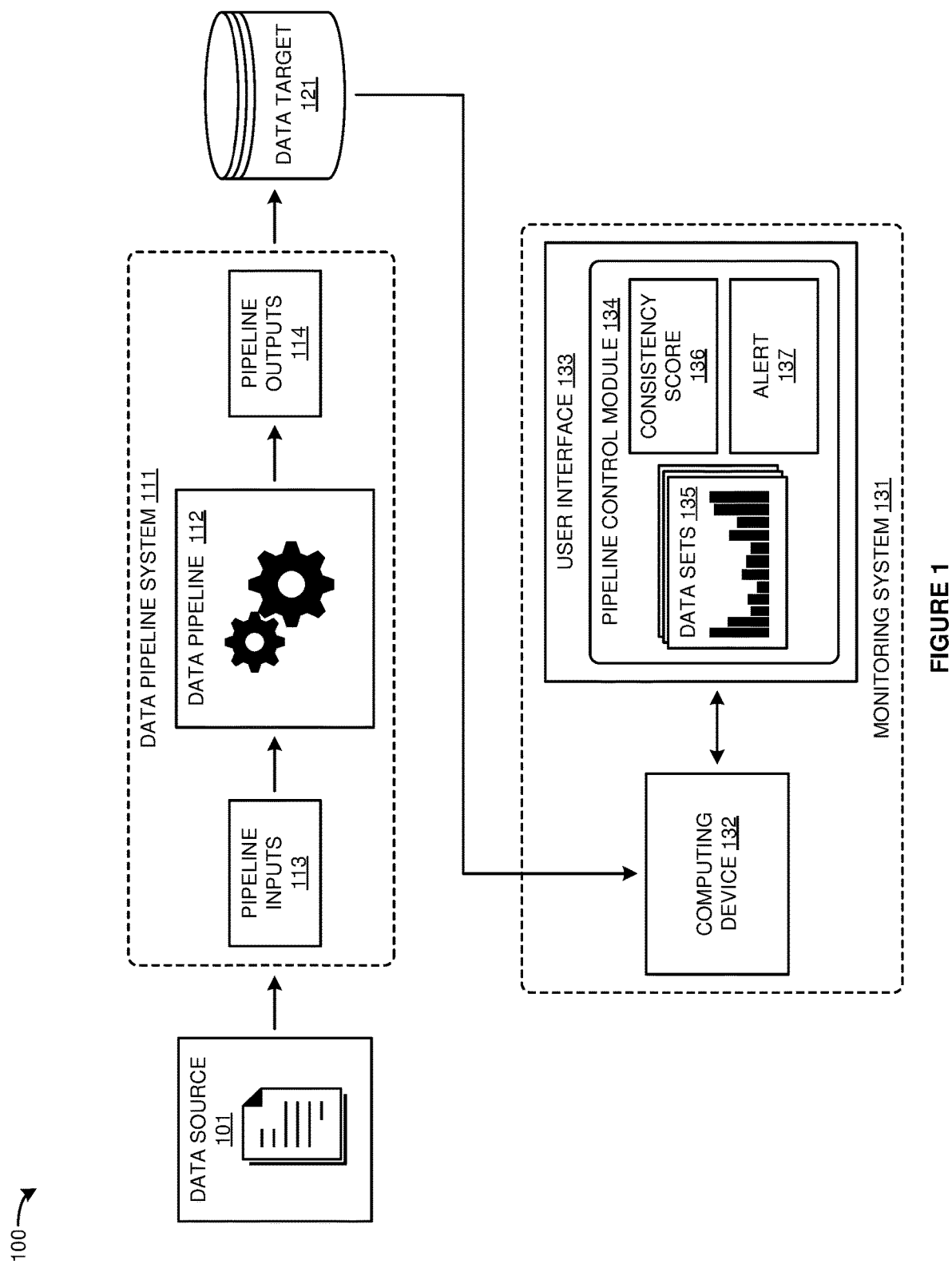
FIG. 1 illustrates an exemplary data processing environment to maintain data consistency in a data pipeline.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Various embodiments of the present technology relate to solutions for monitoring the operations of data pipeline systems. More specifically, embodiments of the present technology relate to systems and methods for maintaining consistency between outputs of a data pipeline to detect problems in the data pipeline. Now referring to the Figures.

FIG. 1 illustrates data processing environment 100 to monitor operations of a data pipeline. Data processing environment 100 processes raw data generated by data sources into a processed form for use in data analytics, data storage, data harvesting, and the like. Data processing environment 100 comprises data source 101, data pipeline system 111, data target 121, and monitoring system 131. Data pipeline system 111 comprises data pipeline 112, pipeline inputs 113, and pipeline outputs 114. Data monitoring system 131 comprises computing device 132, user interface 133, and pipeline control module 134. In other examples, data processing environment 100 may include fewer or additional components than those illustrated in FIG. 1. Likewise, the illustrated components of data processing environment 100 may include fewer or additional components, assets, or connections than shown. Each of data source 101, data pipeline system 111, data target 121, and/or monitoring system 131 may be representative of a single computing apparatus or multiple computing apparatuses.

Data source 101 is operatively coupled to data pipeline system 111. Data source 101 is representative one or more systems, apparatuses, computing devices, and the like that generate raw data for consumption by data pipeline system 111. Data source 101 may comprise a computing device of an industrial system, a financial system, research system, or some other type of system configured to generate data that characterizes that system. For example, data source 101 may comprise a computer affiliated with an online transaction service that generates sales data which characterizes events performed by the online transaction service. It should be appreciated that the type of data generated by data source 101 is not limited.

Data pipeline system 111 is operatively coupled to data pipeline source 101 and data target 121. Data pipeline system 111 is representative of a data processing environment which intakes "raw" or otherwise unprocessed data from data source 101 and emits processed data configured for consumption by an end user. Data pipeline system 111 comprises data pipeline 112, pipeline inputs 113, and pipeline outputs 114. Pipeline inputs 113 comprise unprocessed data generated by data source 101. Pipeline outputs 114 comprise processed data generated by the one or more data processing operations implemented by data pipeline 112. Data pipeline 112 comprises one or more computing devices that are connected in series that intake pipeline inputs 113 received from data source 101 and generate pipeline outputs 114. For example, the computing devices of data pipeline 112 may ingest pipeline inputs 113 and execute transform functions on pipeline inputs 113. The execution of the transform functions alters pipeline inputs 113 into a consumable form to generate pipeline outputs 114. For example, pipeline inputs 113 may comprise a non-standard schema. The execution of the transform functions may standardize the schema of pipeline inputs 113 to generate pipeline outputs 114 which can then be loaded into a database on data target 121.

Data target 121 is operatively coupled to data pipeline system 111 and monitoring system 131. Data target 121 is representative of one or more computing systems comprising memory that receive pipeline outputs 114 generated by data pipeline 112. Data target 121 may comprise a database, data structure, data repository, data lake, another data pipeline, and/or some other type of data storage system. In some examples, data target 121 may transfer pipeline outputs 114 received from data pipeline system 111 to computing device 132 to facilitate the pipeline monitoring operations of monitoring system 131.

Monitoring system 131 is operatively coupled to data pipeline system 111. Monitoring system 131 is representative of one or more computing devices configured to monitor the operation of data pipeline system 111. Monitoring system 131 is configured to ingest pipeline outputs 114 from data target 121. Alternatively, monitoring system 131 may possess a communication link with data pipeline system 111 and receive pipeline outputs 114 directly from data pipeline system 111. Monitoring system 131 comprises computing device 132, user interface 133, and pipeline control module 134. Computing device 132 comprises one or more computing apparatuses configured to host pipeline control module 134. Pipeline control module 134 is representative of one or more applications configured to monitor the operation of data pipeline system 111. It should be appreciated that the specific number of applications or modules hosted by computing device 132 is not limited. Exemplary applications hosted by computing device 132 to monitor the operations of data pipeline system 111 include Data Culpa Validator and the like. Computing device 132 is coupled to user interface 133. User interface 133 comprises a display, keyboard, touchscreen, tablet, and/or other elements configured to provide a visual representation of, and means to interact with, pipeline control module 134. For example, user interface 133 may receive keyboard inputs, touchscreen inputs, and the like to facilitate interaction between a user and pipeline control module 134. User interface 133 provides a Graphical User Interface (GUI) that allows a user to interact with pipeline control module 134 and/or any other application(s) hosted by computing device 102 to monitor the operation of data pipeline system 111.

Pipeline control module 134 comprises visual elements to illustrate consistency in pipeline outputs 114 and to monitor the operations of data pipeline 112. The visual elements include data sets 135, consistency score 136, and alert 137. Data sets 135 comprises graphics like histograms and probability distributions to characterize the volumes, data types, data schemas, data values, and the like characterizing pipeline outputs 114. Data sets 135 may additionally comprise text-based information to contextualize the histograms, probability distributions, or other types of graphics that comprise data sets 135. For example, data sets 135 may comprise a histogram that categorizes the value distribution for one of pipeline outputs 114 and comprise text-based information indicating the histogram represents an output data set that was generated on a particular date. Consistency score 136 comprises one or more numeric metrics and graphical elements characterizing the amount of relative change between the output data sets that comprise pipeline outputs 114. For example, consistency score 136 may comprise a numeric value between 0 and 1 that indicates the amount of difference between data sets of pipeline outputs 114. A numeric value near 0 may indicate a low amount of difference between data sets of pipeline outputs 114 while a numeric value near 1 may indicate a high amount of difference between data sets of pipeline outputs 114. Alerts 137 comprises notifications that indicate when the consistency score for pipeline outputs 114 exceeds a threshold value. The threshold value may comprise a user defined threshold that defines an acceptable level of difference between data sets of pipeline outputs 114. For example, pipeline control module 134 may calculate consistency score 136 and apply the threshold value to consistency score 136 and generate alert 137 when alert consistency score 136 exceeds the threshold value. The notifications of alert 137 may comprise contextual information that indicates which data sets of pipeline outputs 114 triggered alert 137, the type of difference, the amount of difference, and/or other types of contextual information.

Data pipeline system 111, data target 121, and monitoring system 131 comprise microprocessors, software, memories, transceivers, bus circuitry, and the like. The microprocessors comprise Central Processing Units (CPUs), Graphical Processing Units (GPUs), Application-Specific Integrated Circuits (ASICs), Field Programmable Gate Arrays (FPGAs), and/or other types of processing circuitry. The memories comprise Random Access Memory (RAM), flash circuitry, disk drives, and/or the like. The memories store software like operating systems, user applications, data analysis applications, and data processing functions. The microprocessors retrieve the software from the memories and execute the software to drive the operation of the data processing system as described herein. The communication links that connect the elements of data processing system use metallic links, glass fibers, radio channels, or some other communication media. The communication links use Time Division Multiplex (TDM), Data Over Cable System Interface Specification (DOCSIS), Internet Protocol (IP), General Packet Radio Service Transfer Protocol (GTP), Institute of Electrical and Electron Engineers (IEEE) 802.11 (WIFI), IEEE 802.3 (ENET), virtual switching, inter-processor communication, bus interfaces, and/or some other data communication protocols. The data pipeline circuitry and data processing circuitry may exist as a single computing device or may be distributed between multiple computing devices.

Figure 2:
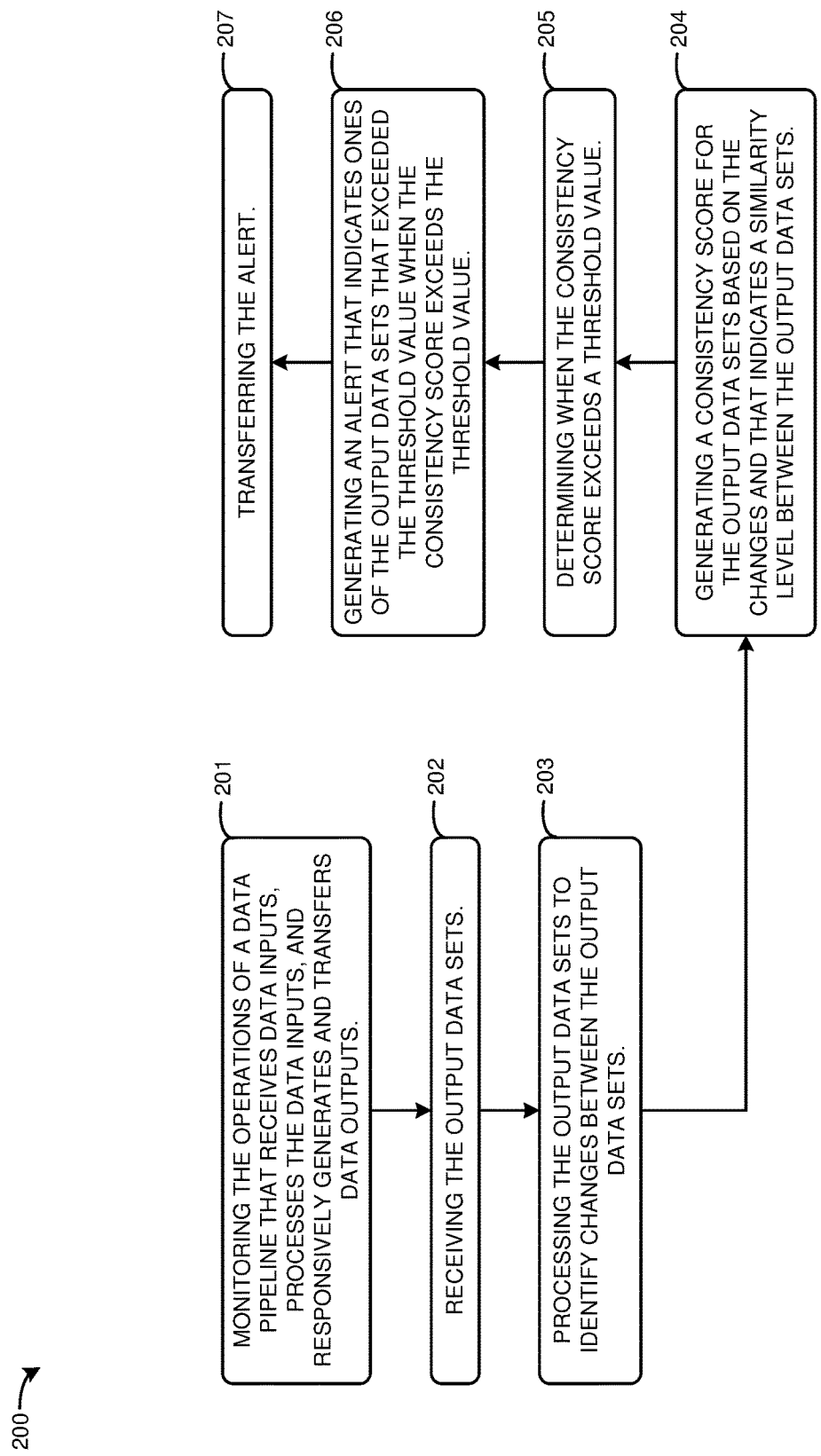
FIG. 2 illustrates an exemplary operation to maintain data consistency in a data pipeline.

In some examples, data processing environment 100 implements process 200 illustrated in FIG. 2. It should be appreciated that the structure and operation of data processing environment 100 may differ in other examples.

FIG. 2 illustrates process 200. Process 200 a process to maintain data consistency in a data pipeline. Process 200 may be implemented in program instructions in the context of any of the software applications, module components, or other such elements of one or more computing devices. The program instructions direct the computing devices(s) to operate as follows, referred to in the singular for the sake of clarity.

The operations of process 200 include monitoring the operations of a data pipeline that receives data inputs, processes the data inputs, and responsively generates and transfers the data outputs (step 201). The operations continue with receiving the output data sets (step 202). The operations continue with processing the output data sets to identify changes between the output data sets (step 203). The operations continue with generating a consistency score for the output data sets based on the changes and that indicates a similarity level between the output data sets (step 204). The operations continue with determining when the consistency score exceeds a threshold value (step 205). The operations continues with generating an alert that indicates ones of the output data sets that exceeded the threshold value when the consistency score exceeds the threshold value (step 206). The operations continue with transferring the alert (step 207).

Referring back to FIG. 1, data processing environment 100 includes a brief example of process 200 as employed by one or more applications hosted by computing device 132 and data pipeline 112. The operation may differ in other examples.

In operation, data pipeline 112 receives pipeline inputs 113 from data sources 101. For example, data pipeline 112 may receive industrial production data comprising a non-uniform set of strings from data source 101. Data pipeline 112 processes the pipeline inputs 113 into a consumable form to generate pipeline output 114. Data pipeline 112 transfers pipeline outputs 114 to data target 121. Data target 121 receives and stores pipeline outputs 114. Computing device 132 is configured to monitor the operations of data pipeline 112 (step 201). For example, computing device 132 may process inputs and outputs of data pipeline 112 to monitor its operations. Data target 121 calls computing device 132 in monitoring system 131 to ingest pipeline outputs 114. For example, computing device 132 may host an Application Programming Interface (API) configured to receive data ingestion requests from data target 121. In some examples, data pipeline system 111 may call computing device 132 to ingest pipeline outputs 114.

Pipeline control module 134 hosted by computing device 132 receives pipeline outputs 114 from data target 121 (step 202). Pipeline outputs 114 comprise a series of data sets generated by the processing operations of data pipeline 112. Pipeline control module 134 processes the data sets that comprise pipeline outputs 114 to identify changes between the output data sets (step 203). Pipeline control module 134 may determine nulls, zero values, missing fields, new fields, value changes, and/or other types of changes between different ones of the output data sets that comprise pipeline outputs 114. Pipeline control module 134 may compare data schemas, data types, data volumes, data values, and the like to track changes between different ones of the output data sets. For example, pipeline control module 134 may generate histograms of data sets 135 that categorize the rate of null values in the output data sets and compare the histograms to identify differences in the rate of null values. Pipeline control module 134 may compare consecutive ones of the output data sets to determine changes the operation of data pipeline 112 over time. For example, pipeline control module 134 may compare an output data set for a first week of operation of pipeline 112 to an output data set for a second week of operation of pipeline 112. Typically, when large discrepancies between the output data sets of pipeline outputs 114 are observed, a problem has occurred within data pipeline 112 that adversely affects pipeline outputs 114.

Pipeline control module 134 scores the identified changes to generate consistency score 136 score to quantify the identified changes (step 204). For example, pipeline control module 134 may execute a consistency function that generates a weighted sum of the values, records, and schemas in the output data sets of pipeline outputs 114 to score the changes between the output data sets. For example, pipeline control module 134 may execute a function that generates a cumulative sum of the values, records, and schemas in the output data sets to score the changes between the output data sets. An exemplary consistency function may comprise a Sigmoid Function. In some examples, the consistency function may comprise the following form:

$$\text{score} = \Sigma_{i=1}^{n}(w_1 \times v_i) + (w_2 \times r_i) + (w_3 \times s_i) \quad (1)$$

where score represents the consistency score, $w_n$ represents the variable weights, $v_i$ represents the data set values, $r_i$ represents the data set records, and $s_i$ represents the data set schemas. It should be appreciated that equation (1) is exemplary and may differ in other examples.

Consistency score 136 may comprise a numerical value between 0 and 1 where 0 indicates minimal change between the output data sets and 1 indicates a dramatic change between the output data sets. Pipeline control module 134 may execute a consistency function that scores the change from one output data set to the next. The method implemented by the pipeline control module 134 to generate consistency score 136 may change depending on the data type of pipeline outputs 114 and user preferences received from an operator.

Once consistency score 136 is generated, pipeline control module 134 applies a consistency threshold to the consistency score 136 to determine when consistency score 136 exceeds the threshold value (step 205). The consistency threshold defines a threshold value that indicates a maximum amount of difference between ones of pipeline outputs 114. For example, the threshold value may be set to 0.25 where consistency scores greater than 0.25 exceed the threshold value. The consistency threshold is configurable to allow a user to set the desired threshold value. For example, a user may interact with pipeline control module 134 via user interface 133 to receive a quality standard from the pipeline operator. Pipeline control module 134 may comprise one or more user selectable options like slider bars and keystroke input boxes that allow a user to select a desired threshold value. The consistency threshold may vary by data type of the input data and for different pipeline operators. For example, pipeline outputs 114 generated from financial data inputs may utilize a different data consistency threshold than pipeline outputs 114 are generated from industrial data inputs.

When consistency score 136 exceeds the threshold value set by the consistency threshold, pipeline control module 134 generates alert 137 that indicates the output data set(s) that violated the consistency threshold, the consistency score for the output data set, and additional information to contextualize the output data set (step 206). For example, the additional information may comprise data like date of generation, data type, change severity, and the like. Pipeline control module 134 transfers the alert to notify pipeline and data target operators (step 207). Pipeline control module 134 may transfer the alert via email, Short Message Service (SMS), and the like. In some examples, pipeline and data target operators may have access to user interface 133 and pipeline control module 134 may instead (or in combination with alert transfer) display alert 137 to notify the operators.

Advantageously, the monitoring system 131 effectively maintains data consistency in the outputs of a data pipeline. Moreover, monitoring system 131 efficiently alerts pipeline operators about changes in data consistency.

Figure 3:
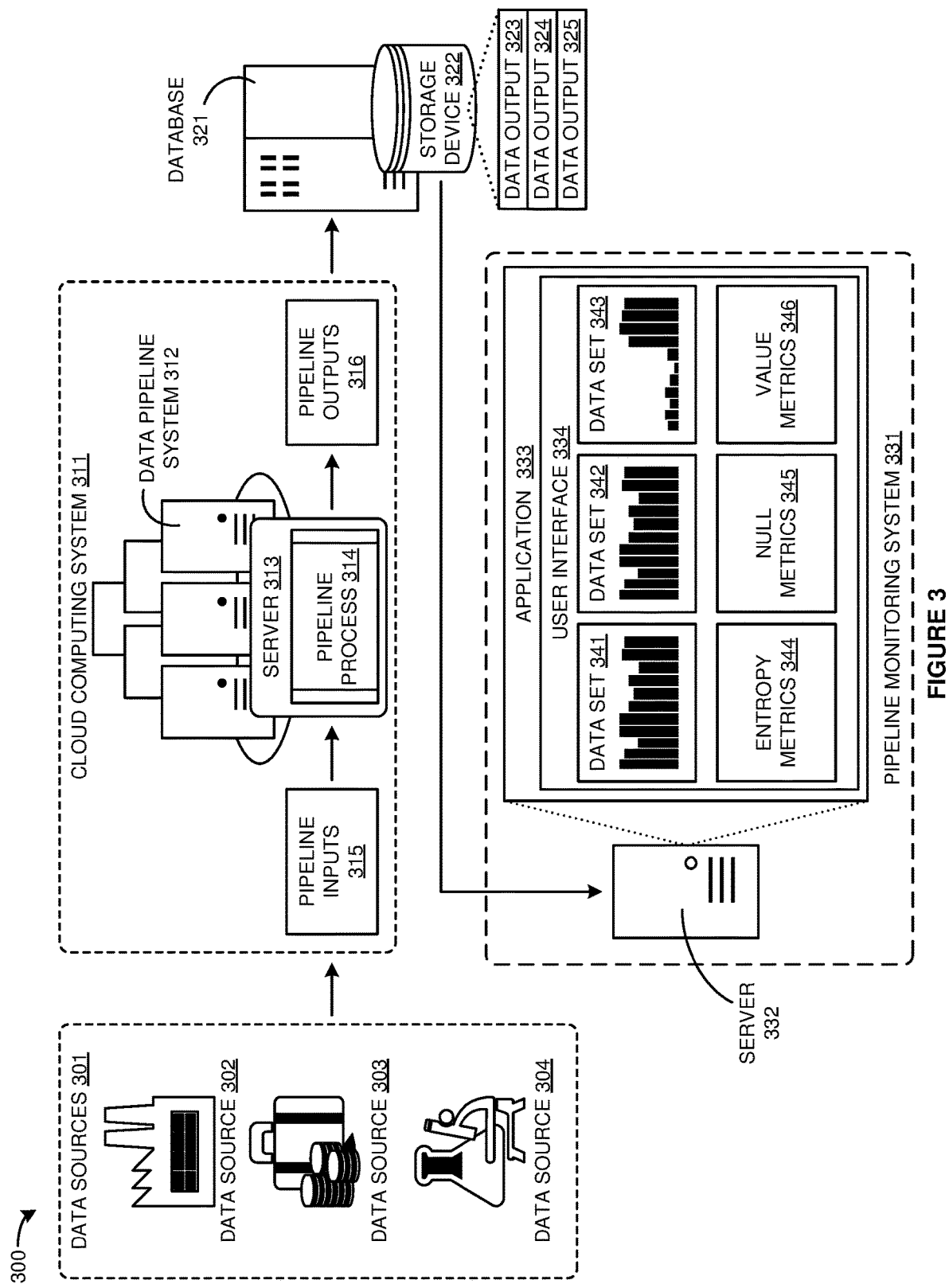
FIG. 3 illustrates an exemplary data processing environment to maintain data consistency in a data pipeline.

FIG. 3 illustrates data processing environment 300 to maintain data consistency in a data pipeline. Data processing environment 300 is an example of data processing environment 100, however data processing environment 100 may differ. Data processing environment 300 comprises data sources 301, cloud computing system 311, database 321, and pipeline monitoring system 331. Data sources 301 comprises data sources 302-304. Cloud computing system 311 comprises data pipeline system 312, server 313, pipeline process 314, pipeline inputs 315, and pipeline outputs 316. Database 321 comprises storage device 322 and data outputs 323-324. Pipeline monitoring system 331 comprises server 332, application 333, user interface 334, data histograms 335, change log 336, data set 337, and alerts 338. In other examples, data processing environment 300 may include fewer or additional components than those illustrated in FIG. 3. Likewise, the illustrated components of data processing environment 300 may include fewer or additional components, assets, or connections than shown. Each of data sources 301, cloud computing system 311, database 321, and/or pipeline monitoring system 331 may be representative of a single computing apparatus or multiple computing apparatuses.

Data sources 301 is representative of one or more computing devices configured to generate input data configured for ingestion by data pipeline system 312. Data sources 301 comprises individual data sources 302-304. Individual data sources 302-304 may produce industrial data, financial data, scientific data, machine learning data, and/or other types of input data for consumption by data pipeline system 312. Typically, the input data generated by data sources 301 is not-suitable for end user consumption (e.g., storage in database 321) and requires data processing by data pipeline system 312. It should be appreciated that the types of data sources that comprise data sources 301 and the input data generated by data sources 301 are not limited.

Cloud computing system 311 is representative of a data processing environment configured to receive and process input data from data sources 301. Cloud computing system 311 is an example of data pipeline system 111, however system 111 may differ. Cloud computing system 311 comprises data pipeline system 312, pipeline inputs 315, and pipeline outputs 316. Data pipeline system 312 is representative of one or more computing devices integrated into a network that communicates with data sources 301 and database 321, and pipeline monitoring system 331. Examples of data pipeline system 312 may include server computers and data storage devices deployed on-premises, in the cloud, in a hybrid cloud, or elsewhere, by service providers such as enterprises, organizations, individuals, and the like. Data pipeline system 312 may rely on the physical connections provided by one or more other network providers such as transit network providers, Internet backbone providers, and the like to communicate with data sources 301, database 321, and/or pipeline monitoring system 331. Data pipeline system 312 comprises server computer 313 which hosts pipeline process 314.

Server computer 313 comprises processors, bus circuitry, storage devices, software, and the like configured to host pipeline process 314. The processors may comprise CPUs, GPUs, ASICs, FPGAs, and the like. The storage devices comprise flash circuitry, RAM, HDDs, SSDs, NVMe SSDs, and the like. The storage devices store the software. The processors may retrieve and execute software stored on the storage devices to drive the operation of pipeline process 314.

Server computer 313 hosts pipeline process 314. Pipeline process 314 comprises a series of processing algorithms configured to transform pipeline inputs 315 into pipeline outputs 316. The data processing algorithms may comprise one or more transform functions configured to operate on pipeline inputs 315. The transform functions may be executed by the processors of server 313 on pipeline inputs 315 and responsively generate pipeline outputs 316. Pipeline inputs 315 comprise data generated by data sources 301. Pipeline outputs 316 comprise data emitted by pipeline process 314. For example, pipeline process 314 may comprise a data cleaning process that transforms pipeline inputs 315 into pipeline outputs 316 suitable for storage in database 321. The cleaning process may comprise reformatting, redundancy removal, or some other type of operation to standardize pipeline inputs 315. It should be appreciated that pipeline process 314 is exemplary and the specific data processing operations implemented by pipeline process 314 are not limited.

In some examples, pipeline process 314 may comprise a machine learning model where pipeline inputs 315 represent machine learning inputs and pipeline outputs 316 represent machine learning outputs. The machine learning model may comprise one or more machine learning algorithms trained to implement a desired process. Some examples of machine learning algorithms include artificial neural networks, nearest neighbor methods, ensemble random forests, support vector machines, naïve Bayes methods, linear regressions, or other types of machine learning algorithms that predict output data based on input data. In this example, pipeline inputs 315 may comprise feature vectors configured for ingestion by the one or more machine learning algorithms and pipeline outputs 316 may comprise machine learning decisions.

Database 321 comprises storage device 322 and is representative of a data target for pipeline process 314. Database 321 is an example of data target 121, however data target 121 may differ. Database 321 comprises processors, bus circuitry, storage devices (including storage device 322), software, and the like configured to store output data sets 323-325. The processors may comprise CPUs, GPUs, ASICs, and the like. The storage devices comprise flash drives, RAM, HDDs, SSDs, NVMe SSDs, and the like. The processors may retrieve and execute software stored upon the storage devices to drive the operation of database 321. Storage device 322 receives and stores pipeline outputs 316 receives and stores from pipeline process 314. Storage device 322 may implement a data structure that categorizes and organizes pipeline outputs 316 according to a data storage scheme. For example, output data sets 323-325 may be organized by data type, size, point of origin, and/or any other suitable data storage scheme. Database 321 may comprise user interface systems like displays, keyboards, touchscreens, and the like that allows a human operator to view the output data sets 323-325 stored upon storage device 322. The user interface systems may allow a human operator to review, select, and transfer ones of data outputs 323-325 to pipeline monitoring system 331.

Pipeline monitoring system 331 is representative of one or more computing devices integrated into a network configured to monitor the operation of data pipeline system 312. Pipeline monitoring system 331 is an example of monitoring system 131, however monitoring system 131 may differ. Pipeline monitoring system 331 comprises server computer 332. Server computer 332 comprises one or more computing devices configured to host application 333. Server 332 is communicatively coupled to database 321 to receive and pipeline outputs 316. The one or more computing devices that comprise server 332 comprise processors, bus circuitry, storage devices, software, and the like. The processors may comprise CPUs, GPUs, ASICs, FPGAs, and the like. The storage devices comprise flash drives, RAM, HDDs, SSDs, NVMe SSDs, and the like. The storage devices store the software. The processors may retrieve and execute software stored on the storage devices to drive the operation of application 333.

Application 333 is representative of one or more pipeline monitoring applications user interface applications, operating systems, modules, and the like. Application 333 is an example of pipeline control module 134, however pipeline control module 134 may differ. Application 333 is configured to receive output data sets generated by data pipeline system 312, identify changes between the output data sets, score the data outputs for their consistency, and generate alerts when the consistency scores exceed a threshold value.

User interface 334 is representative of a display that provides a graphical representation of application 333. The graphical representation comprises a GUI. The graphical representation on user interface 334 includes data sets 341-343, entropy metrics 344, null metrics 345, and value metrics 346. In other examples, the graphical representation may include additional or different types of visual indicators relevant to the operation and status of data pipeline system 312. Data sets 341-343 comprises a visual representation of pipeline outputs 316. In this example, user interface 334 presents three of data sets 341-343, however in other examples of user interface 334 may present may more data sets than those illustrated in FIG. 3. In this example, the visual representations that comprise data sets 341-343 comprise histograms that categorize various attributes of pipeline outputs 316. However, in other examples the visual representations may comprise probability distributions, data volumes, lineage charts, or other types of visual representations to characterize pipeline outputs 316. The histograms of data sets 341 may characterize data values, null value rates, zero value rates, and the like for pipeline outputs 316.

Entropy metrics 344 indicate data entropy rates for the data sets that comprise pipeline outputs 316. Data entropy describes the tendency for a data set to exhibit unexpected data values. For example, a pipeline output that normally comprises values between 0-10 and now comprises values between 0-100 may comprise a high data entropy. A data set with low data entropy comprises a low tendency to have unexpected values while a data set with high entropy comprises a high tendency to exhibit have unexpected data values. Null metrics 345 indicate the number of null fields the data sets that comprise pipeline outputs 316 possess. A null field indicates when a data field that is typically present in an output data set is no longer present. Value metrics 346 indicate the data value ranges the comprise data sets of pipeline outputs 316. For example, value metrics 346 may indicate the proportion of data values between 0-10, the proportion of data values between 11-20, and the proportion of data values between 21-30 that comprise a data set of pipeline outputs 316.

Application 333 utilizes data sets 341-343, entropy metrics 344, null metrics 345, and value metrics 346 to determine the consistency (e.g., amount of difference) between individual ones of pipeline outputs 316. Application 333 identifies the magnitude of change between the histograms of data sets 341-343, data entropy differences, null value differences, and value distribution differences to calculate the consistency of pipeline outputs 316. Application 333 calculates a consistency score for pipeline outputs 316 based on data sets 341-343, entropy metrics 344, null metrics 345, and value metrics 346. For example, application 333 may execute a consistency function that intakes data sets 341-343, entropy metrics 344, null metrics 345, and value metrics 346 as inputs and outputs a consistency score that indicates how different pipeline outputs 316 are from one another. Application 333 applies a user defined consistency threshold to the consistency score to determine when the amount of difference between pipeline outputs 316 exceeds an acceptable value. For example, application 333 may receive user inputs via user interface 334 that define the consistency threshold. Application 333 is also configured to generate and transfer alerts that indicate when the consistency score for pipeline outputs 316 exceeds the consistency threshold.

User interface 334 may include a computer, a display, a mobile device, a touchscreen device, or some other type of computing device capable of performing the user interface functions described herein. A user may interact with application 333 via user interface 334 to generate, view, and interact with data sets 341-343, entropy metrics 344, null metrics 345, and value metrics 346. For example, user interface 334 may receive a user input to view and interact with data sets 341-343.

Figure 4:
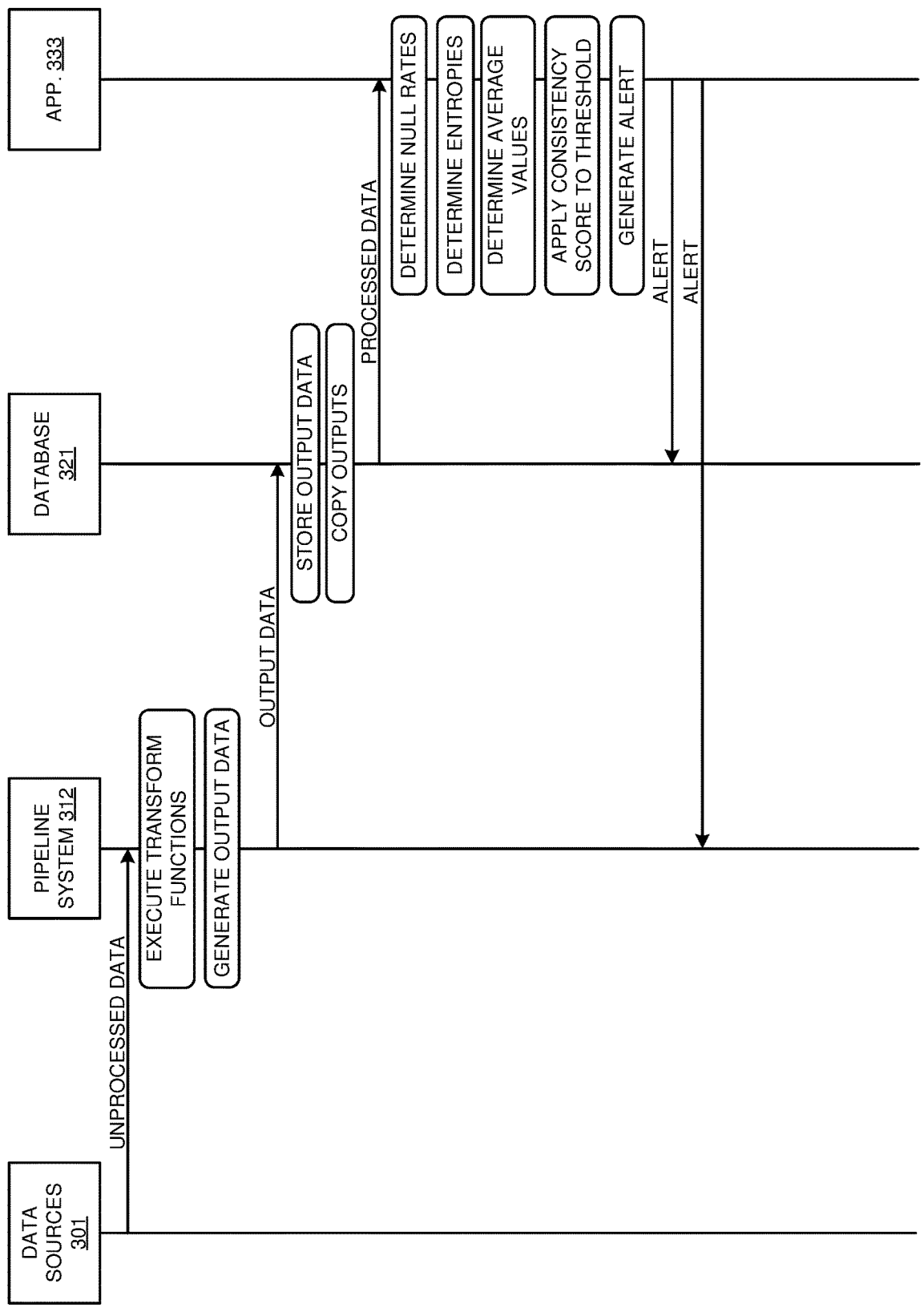
FIG. 4 illustrates an exemplary operation to maintain data consistency in a data pipeline.

FIG. 4 illustrates an exemplary operation of data processing environment 300 to maintain data consistency in a data pipeline. The operation depicted by FIG. 4 comprises an example of process 200 illustrated in FIG. 2, however process 200 may differ. In other examples, the structure and operation of data processing environment 300 may be different.

In operation, data sources 301 transfer unprocessed data to data pipeline 312. For example, data sources 301 may generate user subscription data and transfer the user subscription data to pipeline system 312 for processing. Data pipeline system 312 receives the unprocessed data as pipeline inputs 315. Data pipeline system 312 ingests pipeline inputs 315 and implements pipeline process 314. Pipeline process 314 cleans, transforms, applies a schema, or otherwise processes pipeline inputs 315 into a consumable form to generate pipeline outputs 316. Data pipeline system 312 transfers pipeline outputs 316 to database 321. Database 321 receives pipeline outputs 316 as output data and stores the output data in storage device 322. Database 321 calls application 333 hosted by server computer 332 to ingest output data generated by data pipeline system 312.

Application 333 accepts the call from database 321 and receives the copied output data stream comprising pipeline outputs 316. Application 333 and generates data sets 341-343 that depict pipeline outputs 316. For example, application 333 may numerically categorize the data values for an output data set of pipeline outputs 316 to generate data sets 341-343. Application 333 groups the categorized values into bins to generate the histograms that represent data sets 341-343. Application 333 determines the magnitude of difference between the histograms to measure the consistency of pipeline outputs 316. For example, application 333 may determine the value distribution for the histogram of data set 343 varies from the histograms of data sets 341 and 342.

Application 333 determines the probability distribution of the output data sets that comprise pipeline outputs 316 to generate entropy metrics 344. For example, application may plot the output data sets and compare the plots to a normalized probability distribution and responsively determine that the output data sets are distributed normally. Application 333 calculates the entropy metrics 344 based on the probability distributions. For example, application 333 may execute an algorithmic process to determine the entropy for probability distributions. The entropy of a data set indicates the average level of uncertainty in the data set. For example, an output data set with low entropy is comprised of expected values while an output data set with high entropy comprises an elevated number of unexpected values. An unexpected value may comprise a null value, zeros, or some other type of unexpected value. Application 333 may generate histograms that depict the entropy for individual ones of the output data sets.

Application 333 calculates the number of null fields in the output data sets that comprise pipeline outputs 316 to generate null metrics 345. For example, application 333 may determine the number of data fields that an output set comprises and the amount of those data field that lack values to determine the number of null fields. Application 333 compare the number of null fields for different ones of the output data sets to identify sets that comprise an unusual number of null fields.

Application 333 calculates average integer values for the output data sets that comprise pipeline outputs 316 to generate value metrics 346. For example, application 333 may sum all of the integer values that comprise an output data set and divide the sum by the total number of integers to calculate the average. Application 333 then compares the average integer values for different ones of the output data sets to determine the magnitude of difference between the average integer values. Application 333 utilizes the differences in average integer values to score the consistency for pipeline outputs 316.

Application 333 generates a consistency score for the pipeline outputs 316 based on the magnitude of change between data sets 341-443, the entropy level indicated by entropy metrics 344, null field differences indicated null metrics 345, and average value differences indicated value metrics 346. Application 333 may utilize a summation function, Sigmoid function, or some other type of function to generate the calculate the score. Application 333 applies the user defined consistency standard to the consistency score. When the consistency score exceeds consistency threshold, application 333 generates and transfers the alert. Application 333 may receive metrics, tolerances, data types, and the like for the output data sets to calculate the consistency score. For example, the pipeline operator may wish to track the consistency of a specific field in the output data sets and direct the application 333 to determine the consistency for the specified field. The alert indicates the output data set of pipeline outputs 316 that fell below the consistency threshold. The alert may include additional information that identifies the date of operation the change occurred and how severe the change was (e.g., observed entropy). Application 333 transfers the alert to pipeline system 312 and database 321 to notify pipeline and database operators to respond to the adverse change in pipeline outputs 316.

In some examples, the application 333 identifies other changes in the output data sets when the consistency score is at or near the consistency threshold. When the consistency score is near the threshold, the margin of error in the consistency score may result in an inaccurate alert generation. When the consistency score is at or near the threshold, application 333 processes the output data sets to identify other changes like volume, number of data fields, data types, or schemas between the output data sets. Application 333 generates a second consistency score for the output data sets based on the other changes. Application 333 applies the threshold to the second consistency score and determines when the second consistency score falls below the threshold.

In some examples, the application 333 omits certain ones of the output data sets when determining the changes between the output data sets. For example, the output data sets may correlate to the days of the week on a one-to-one basis. Application 333 avoids processing output data sets generated on days of the week when expected inconsistencies in the output data occur. For example, application 333 may avoid processing output data sets generated on the weekend or holidays.

Figure 5:
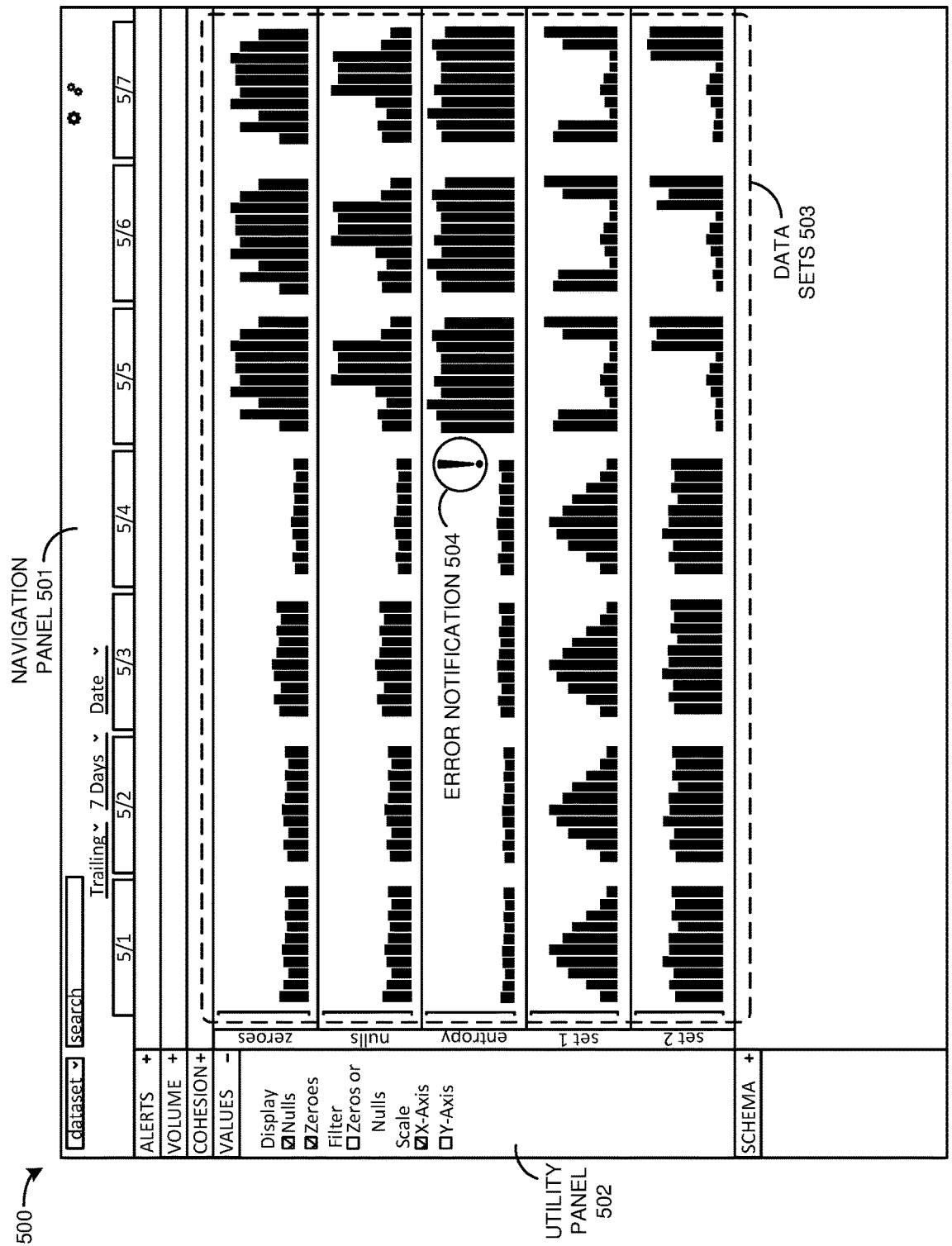
FIG. 5 illustrates an exemplary user interface to maintain data consistency in a data pipeline.

FIG. 5 illustrates user interface 500 to maintain data consistency in a data pipeline. User interface 500 comprises an example of user interface 133 and user interface 334, however user interface 133 and user interface 334 may differ. User interface 500 comprises a pipeline monitoring application presented on a display screen which is representative of any user interface for monitoring the operation of a data pipeline. User interface 500 comprises a GUI configured to allow a user to view data consistency for data pipeline outputs over time and receive alerts regarding data consistency. The GUI provides visualizations for how data set values, data set entropy, data set zero values, and data set null values change over time. In other examples, the GUI of user interface may include additional elements not illustrated in FIG. 5 to maintain data consistency in a data pipeline.

User interface 500 includes navigation panel 501. Navigation panel 501 comprises tabs like "dataset" and "search" that allows a user to find and import data sets into user interface 500. For example, a user may interact with the "dataset" tab to import a data set from a data pipeline system. Navigation panel 501 also includes date range options to select data sets a data set from a period of time. In this example, a user has selected to view a data set over a week ranging from May $1^{st}$ to May $7^{th}$ labeled as 5/1-5/7 in user interface 500. In other examples, a user may select a different date range and/or a different number of days.

User interface 500 includes utility panel 502. Utility panel 502 comprises tabs labeled "ALERTS", "VOLUME", "COHESION", "VALUES", and "SCHEMA". In other examples, utility panel 502 may comprise different tabs than illustrated in FIG. 5. When a user selects one or the tabs, the tab expands to reveal its contents. In this example, a user has opened the "VALUES" tab. The "VALUES" tab comprises data sets 503. The "ALERTS" tab also includes display options to modify the view of data sets 503. The display options include toggles labeled "Nulls", "Zeroes", "Zeroes or Nulls", "X-Axis", and "Y-Axis". In other examples, the display options may differ.

User interface 500 includes data sets 503. Data sets 503 comprises histogram visualizations of data sets imported into user interface 500. In this example, data sets 503 include "zeroes", "nulls", "entropy", "set 1", and "set 2". Each data set of data sets 503 corresponds to the date selected by a user in navigation panel 501. For example, the "zeroes" data set of data sets 503 is presented as a row with each portion of the set corresponding to the dates presented in navigation panel 501. Data sets 503 allows a user to view the shape and/or other attributes of the imported data sets. The "zeroes" sets of data sets 503 comprise histograms that characterize the number of zero values for the data fields that comprise outputs of a data pipeline. The "nulls" sets of data sets 503 comprise histograms that characterize the number of null fields for the data sets that comprise outputs of a data pipeline. The "entropy" sets of data sets 503 comprise histograms that characterize the entropy level for the data fields that comprise outputs of a data pipeline. The "set 1" and "set 2" sets of data sets 503 comprises histograms that characterize the value distributions for the data fields that comprise outputs of a data pipeline. In other examples, data sets 503 may comprise different types of data sets than those illustrated in FIG. 5.

In some examples, user interface 500 may comprise a cohesion chart that indicates how different a selected data set is from established data set averages. For example, the cohesion chart may comprise a bulls-eye diagram. The center of the bulls-eye diagram may indicate a data set average and may plot data sets of the diagram based on their distance from the data set average. Typically, data sets more similar to the data set average are plotted closer to the center of the bulls-eye diagram. The bulls-eye diagram may represent average null rates, average zero value rates, average entropy rates, and the like. For example, the center of the bulls-eye diagram may comprise average data set entropy and may plot the entropy for other data sets to illustrate the entropy difference between a selected data set and an average data set entropy.

User interface 500 includes error notification 504. Error notification 504 comprises a user selectable option and indicates that a data consistency error has been identified in the outputs of the data pipeline. For example, the data monitoring application represented by user interface 500 may calculate a consistency score based on the data outputs of a data pipeline and determine that the consistency score exceeds a consistency threshold. In response, the application may display error notification 504. In this example, error notification 504 indicates the pipeline monitoring application measured a pipeline output inconsistency between the dates of 5/4 and 5/5. As illustrated in FIG. 5, the histograms for "zeroes", "nulls", and "entropy" comprise an increase between 5/4 and 5/5. Additionally, the histograms for "set 1"

and "set 2" show a change in value distributions between 5/4 and 5/5. Generally, increases data entropy, changes in the amount of observed zero values and null fields, and changes in value distributions are indicative of inconsistencies in the outputs of a data pipeline. In response to a selection of error notification 504, user interface 500 may display additional information to contextualize the detected inconsistency.

Figure 6:
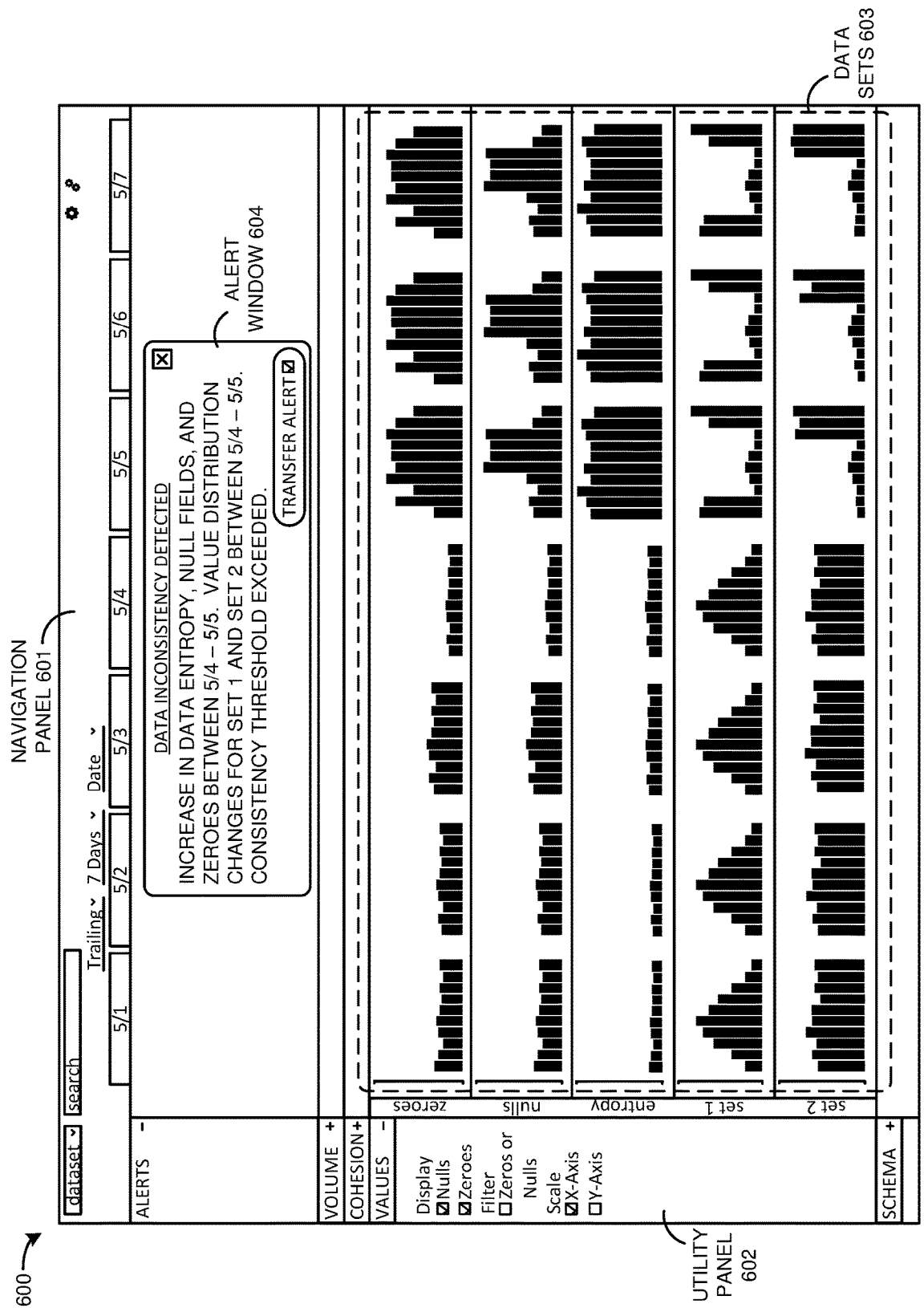
FIG. 6 illustrates an exemplary user interface to maintain data consistency in a data pipeline.

FIG. 6 illustrates user interface 600 to maintain data consistency in a data pipeline. User interface 600 comprises an example of user interface 133 and user interface 334, however user interface 133 and user interface 334 may differ. User interface 600 comprises a pipeline monitoring application presented on a display screen which is representative of any user interface for monitoring the operation of a data pipeline. User interface 600 comprises a GUI configured to allow a user to view data consistency for data pipeline outputs over time and receive alerts regarding data consistency. The GUI provides visualizations for how data set values, data set entropy, data set zero values, and data set null values change over time. In other examples, the GUI of user interface may include additional elements not illustrated in FIG. 6 to maintain data consistency in a data pipeline. In this example, user interface 600 is representative of a continuation of operations of user interface 500 illustrated in FIG. 5. For example, a computing device may generate user interface 600 in response to a user selection of error notification 504 illustrated in FIG. 5.

User interface 600 includes navigation panel 601. Navigation panel 601 comprises tabs like "dataset" and "search" that allows a user to find and import data sets into user interface 600. Navigation panel 601 also includes date range options to select data sets a data set from a period of time. In this example, a user has selected to view a data set over May $1^{st}$ to May $7^{th}$ labeled as 5/1-5/7 in user interface 600. In other examples, a user may select a different date range and/or a different number of days.

User interface 600 includes utility panel 602. Utility panel 602 comprises tabs labeled "ALERTS", "VOLUME", "COHESION", "VALUES", and "SCHEMA". In other examples, utility panel 602 may comprise different tabs than illustrated in FIG. 6. When a user selects one or the tabs, the tab expands to reveal its contents. In this example, a user has opened the "VALUES" tab. The "VALUES" tab comprises data sets 603. The "ALERTS" tab also includes display options to modify the view of data sets 603. The display options include toggles labeled "Nulls", "Zeroes", "Zeroes or Nulls", "X-Axis", and "Y-Axis". In other examples, the display options may differ.

User interface 600 includes data sets 603. Data sets 603 comprises histogram visualizations of data sets imported into user interface 600. In this example, data sets 603 include "zeroes", "nulls", "entropy", "set 1", and "set 2". Each data set of data sets 603 corresponds to the date selected by a user in navigation panel 601. Data sets 603 allows a user to view the shape and/or other attributes of the imported data sets. The "zeroes" sets of data sets 603 comprise histograms that characterize the number of zero values for the data fields that comprise outputs of a data pipeline. The "nulls" sets of data sets 603 comprise histograms that characterize the number of null fields for the data sets that comprise outputs of a data pipeline. The "entropy" sets of data sets 603 comprise histograms that characterize the entropy level for the data fields that comprise outputs of a data pipeline. The "set 1" and "set 2" sets of data sets 603 comprises histograms that characterize the value distributions for the data fields that comprise outputs of a data pipeline. In other examples, data sets 603 may comprise different types of data sets than those illustrated in FIG. 6.

User interface 600 includes alert window 604. Alert window 604 may be generated and presented in response to selection of alert notification 504 illustrated in FIG. 5. Alert window 604 comprises an alert that indicates the consistency threshold was exceeded. Alert window 604 comprises information to contextualize the detected inconsistency. In this example, the contextual information indicates an increase in entropy, null fields, and zeroes was detected and that a value distribution change was also detected. Alert window 604 comprises options labeled "TRANSFER ALERT". Selecting the "TRANSFER ALERT" option may cause the application to forward alert 604 to pipeline operators. Alternatively, a user may select the x-mark in the top right corner of alert window 604 to close the window without transferring the alert. In this example, a user has selected the "TRANSFER" option to transfer the alert to data pipeline operators. In other examples, alert window 604 may include the consistency score for the selected data sets and information indicated how much the score exceeded the user defined consistency threshold.

Figure 7:
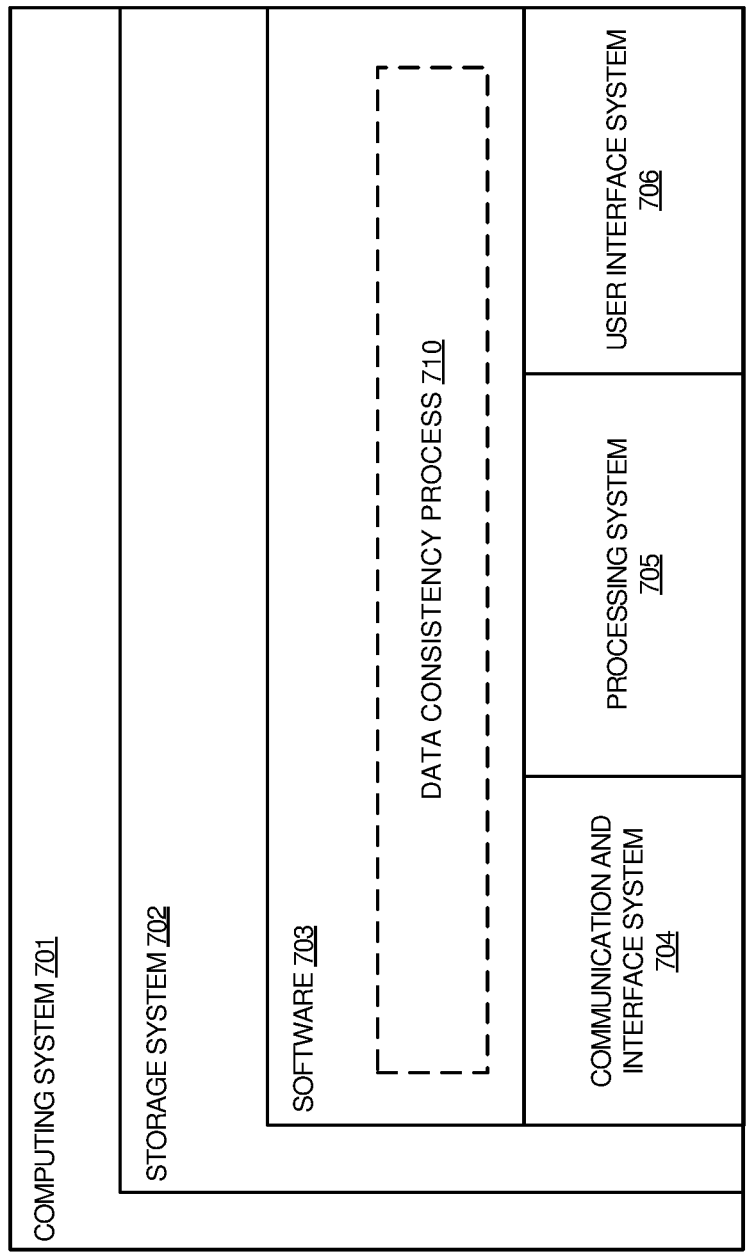
FIG. 7 illustrates an exemplary computing device that may be used in accordance with some embodiments of the present technology.

FIG. 7 illustrates computing device 701 which is representative of any system or collection of systems in which the various processes, programs, services, and scenarios disclosed herein for maintaining data consistency in a data pipeline within data processing environments may be implemented. For example, computing device 701 may be representative of data pipeline system 111, data target 121, computing device 132, user interface 133, cloud computing system 311, database 321, server 332, user interface 500, and/or user interface 600. Examples of computing system 701 include, but are not limited to, server computers, routers, web servers, cloud computing platforms, and data center equipment, as well as any other type of physical or virtual server machine, physical or virtual router, container, and any variation or combination thereof.

Computing system 701 may be implemented as a single apparatus, system, or device or may be implemented in a distributed manner as multiple apparatuses, systems, or devices. Computing system 701 includes, but is not limited to, storage system 702, software 703, communication and interface system 704, processing system 705, and user interface system 706. Processing system 705 is operatively coupled with storage system 702, communication interface system 704, and user interface system 706.

Processing system 705 loads and executes software 703 from storage system 702. Software 703 includes and implements data consistency process 710, which is representative of the processes to maintain data consistency in a data pipeline discussed with respect to the preceding Figures. For example, data consistency process 710 may be representative of process 200 illustrated in FIG. 2 and/or the exemplary operation of environment 300 illustrated in FIG. 4. When executed by processing system 705, software 703 directs processing system 705 to operate as described herein for at least the various processes, operational scenarios, and sequences discussed in the foregoing implementations. Computing system 701 may optionally include additional devices, features, or functionality not discussed here for purposes of brevity.

Processing system 705 may comprise a micro-processor and other circuitry that retrieves and executes software 703 from storage system 702. Processing system 705 may be implemented within a single processing device but may also be distributed across multiple processing devices or sub-systems that cooperate in executing program instructions. Examples of processing system 705 include general purpose central processing units, graphical processing units, application specific processors, and logic devices, as well as any other type of processing device, combinations, or variations thereof.

Storage system 702 may comprise any computer readable storage media that is readable by processing system 705 and capable of storing software 703. Storage system 702 may include volatile and nonvolatile, removable, and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 702 may also include computer readable communication media over which at least some of software 703 may be communicated internally or externally. Storage system 702 may be implemented as a single storage device but may also be implemented across multiple storage devices or sub-systems co-located or distributed relative to each other. Storage system 702 may comprise additional elements, such as a controller, capable of communicating with processing system 705 or possibly other systems.

Software 703 (data consistency process 710) may be implemented in program instructions and among other functions may, when executed by processing system 705, direct processing system 705 to operate as described with respect to the various operational scenarios, sequences, and processes illustrated herein. For example, software 703 may include program instructions for generating a user interface to visualize data pipeline monitoring operations as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 703 may include additional processes, programs, or components, such as operating system software, virtualization software, or other application software. Software 703 may also comprise firmware or some other form of machine-readable processing instructions executable by processing system 705.

In general, software 703 may, when loaded into processing system 705 and executed, transform a suitable apparatus, system, or device (of which computing system 701 is representative) overall from a general-purpose computing system into a special-purpose computing system customized to monitor data output consistency of a data pipeline as described herein. Indeed, encoding software 703 on storage system 702 may transform the physical structure of storage system 702. The specific transformation of the physical structure may depend on various factors in different implementations of this description. Examples of such factors may include, but are not limited to, the technology used to implement the storage media of storage system 702 and whether the computer-storage media are characterized as primary or secondary storage, as well as other factors.

For example, if the computer readable storage media are implemented as semiconductor-based memory, software 703 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 704 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 701 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

While some examples provided herein are described in the context of computing devices to maintain data consistency, it should be understood that the condition systems and methods described herein are not limited to such embodiments and may apply to a variety of other extension implementation environments and their associated systems. As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A data pipeline monitoring system configured to maintain data consistency in a data pipeline, the data pipeline monitoring system comprising:

data monitoring circuitry configured to monitor operations of the data pipeline wherein the data pipeline receives input data sets, processes the input data sets, and responsively generates and transfers output data sets;

the data monitoring circuitry configured to receive the output data sets, process the output data sets to identify changes between the output data sets, utilize a Sigmoid function to calculate weighted sums of data values, data records, and data schemas for the output data sets, generate a consistency score for the output data sets based on the changes and the weighted sums, and determine when the consistency score exceeds a threshold value, wherein the consistency score indicates a similarity level between the output data sets; and when the consistency score exceeds the threshold value, the data monitoring circuitry configured to generate and transfer an alert that indicates ones of the output data sets that exceeded the threshold value.

2. The data pipeline monitoring system of claim 1, wherein the data monitoring circuitry is configured to identify changes between the output data sets and generate the consistency score comprises the data monitoring circuitry configured to determine null value rates for the output data sets, compare the null value rates between different ones of the output data sets, and generate the consistency score based on the comparison.

3. The data pipeline monitoring system of claim 1, wherein the data monitoring circuitry is configured to identify changes between the output data sets and generate the consistency score comprises the data monitoring circuitry configured to determine data entropies for the output data sets, compare the data entropies between different ones of the output data sets, and generate the consistency score based on the comparison.

4. The data pipeline monitoring system of claim 1, wherein the data monitoring circuitry is configured to identify changes between the output data sets and generate the consistency score comprises the data monitoring circuitry configured to determine average data values for the output data sets, compare the average data values between different ones of the output data sets, and generate the consistency score based on the comparison.

5. The data pipeline monitoring system of claim 1, wherein the alert indicates a severity level for the identified changes.

6. The data pipeline monitoring system of claim 5, wherein the alert indicates a date of operation the identified changes occurred.

7. The data pipeline monitoring system of claim 1, wherein the threshold value comprises a user configurable threshold value.

8. A method of operating a data pipeline monitoring system configured to maintain data consistency in a data pipeline, the method comprising:
    data monitoring circuitry monitoring operations of the data pipeline wherein the data pipeline receives input data sets, processes the input data sets, and responsively generates and transfers output data sets;
    the data monitoring circuitry receiving the output data sets, processing the output data sets to identify changes between the output data sets, utilizing a Sigmoid function to calculate weighted sums of data values, data records, and data schemas for the output data sets, generating a consistency score for the output data sets based on the changes and the weighted sums, and determining when the consistency score exceeds a threshold value, wherein the consistency score indicates a similarity level between the output data sets; and
    when the consistency score exceeds the threshold value, the data monitoring circuitry generating and transferring an alert that indicates ones of the output data sets that exceeded the threshold value.

9. The method of claim 8, wherein the data monitoring circuitry identifying changes between the output data sets and generating the consistency score comprises the data monitoring circuitry determining null value rates for the output data sets, comparing the null value rates between different ones of the output data sets, and generating the consistency score based on the comparison.

10. The method of claim 8, wherein the data monitoring circuitry identifying changes between the output data sets and generating the consistency score comprises the data monitoring circuitry determining data entropies for the output data sets, comparing the data entropies between different ones of the output data sets, and generating the consistency score based on the comparison.

11. The method of claim 8, wherein the data monitoring circuitry identifying changes between the output data sets and generating the consistency score comprises the data monitoring circuitry determining average data values for the output data sets, comparing the average data values between different ones of the output data sets, and generating the consistency score based on the comparison.

12. The method of claim 8, wherein the alert indicates a severity level for the identified changes.

13. The method of claim 12, wherein the alert indicates a date of operation the identified changes occurred.

14. The method of claim 8, wherein the threshold value comprises a user configurable threshold value.

15. A non-transitory computer-readable medium storing instructions to maintain data consistency in a data pipeline, wherein the instructions, in response to execution by one or more processors, cause the one or more processors to drive a system to perform operations comprising:
    monitoring operations of the data pipeline wherein the data pipeline receives input data sets, processes the input data sets, and responsively generates and transfers output data sets;
    receiving the output data sets;
    processing the output data sets to identify changes between the output data sets;
    utilizing a Sigmoid function to calculate weighted sums of data values, data records, and data schemas for the output data sets;
    generating a consistency score for the output data sets based on the changes and the weighted sums, wherein the consistency score indicates a similarity level between the output data sets;
    determining when the consistency score exceeds a threshold value;
    generating an alert that indicates ones of the output data sets that exceeded the threshold value when the consistency score exceeds the threshold value; and
    transferring the alert.

16. The non-transitory computer-readable medium of claim 15, the operations further comprising:
    determining null value rates for the output data sets;
    comparing the null value rates between different ones of the output data sets; and
    generating the consistency score based on the comparison.

17. The non-transitory computer-readable medium of claim 15, the operations further comprising:
    determining data entropies rates for the output data sets;
    comparing the data entropies between different ones of the output data sets; and
    generating the consistency score based on the comparison.

18. The non-transitory computer-readable medium of claim 15, the operations further comprising:
    determining data values rates for the output data sets;
    comparing the data values between different ones of the output data sets; and
    generating the consistency score based on the comparison.

19. The non-transitory computer-readable medium of claim 15, wherein the alert indicates a severity level for the identified changes and a date of operation the identified changes occurred.

20. The non-transitory computer-readable medium of claim 15, wherein the threshold value comprises a user configurable threshold value.

* * * * *